Nov. 22, 1966  E. P. DAZZO  3,286,417
DOOR-SEALING DEVICE FOR TRUCK DOCK
Filed July 28, 1965
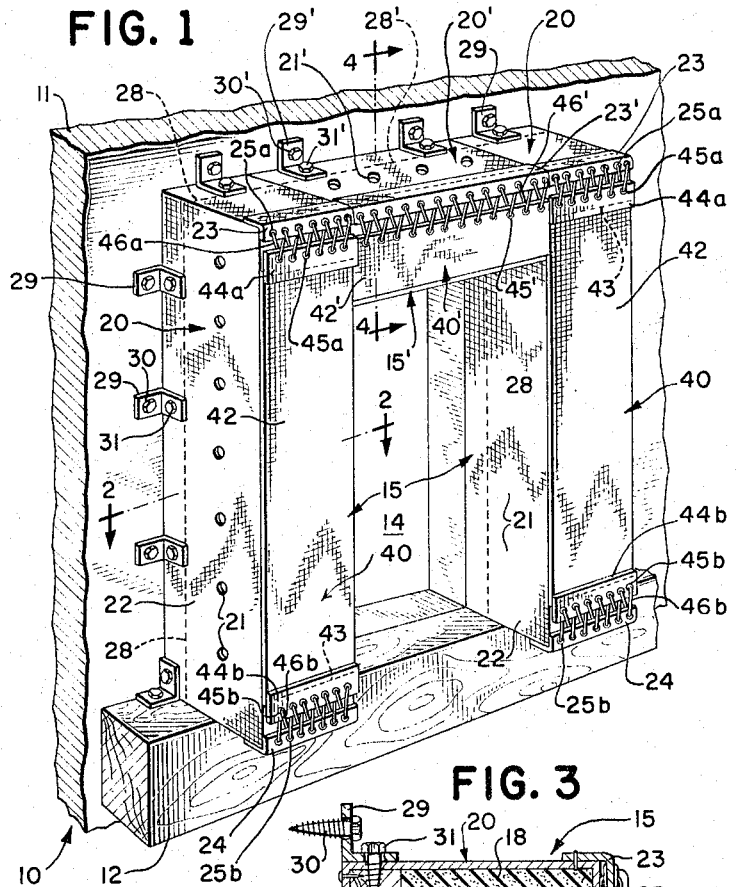
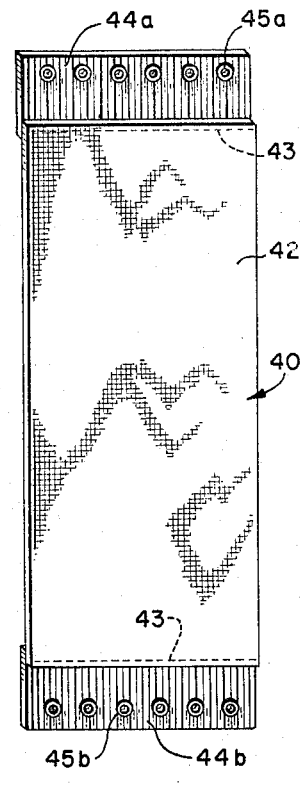
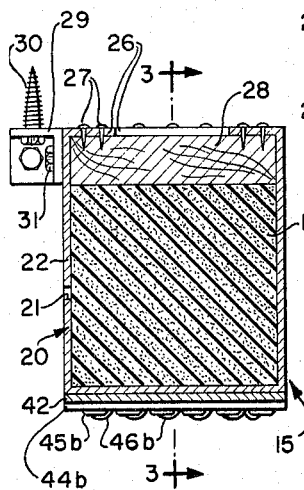
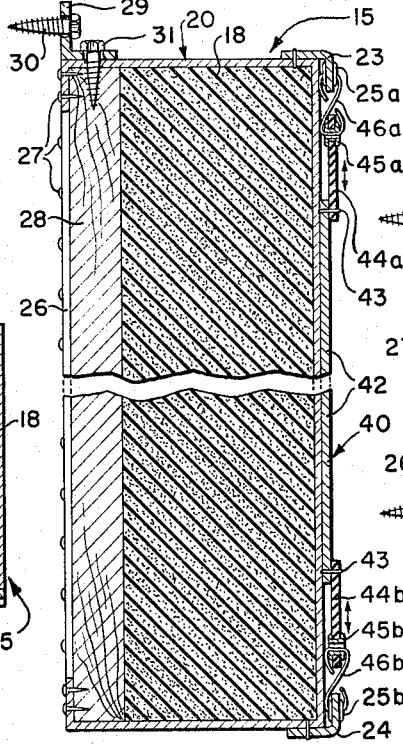
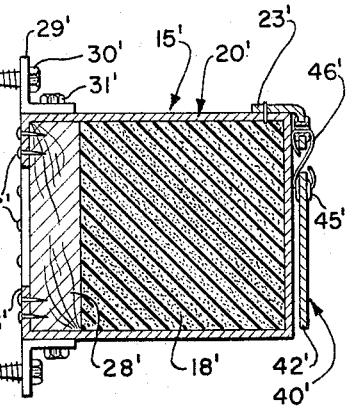
INVENTOR.
ERROL P. DAZZO
BY J. B. Burke
ATTORNEY

United States Patent Office 3,286,417
Patented Nov. 22, 1966

3,286,417
DOOR-SEALING DEVICE FOR TRUCK DOCK
Errol P. Dazzo, 528–42 Park Ave., Brooklyn, N.Y.
Filed July 28, 1965, Ser. No. 477,359
13 Claims. (Cl. 52—204)

This application is a continuation-in-part of my copending application Ser. No. 290,358, filed June 25, 1963, now abandoned.

This invention concerns a sealing device for a door of a truck dock.

Many plants which are heated during the cold months, as well as air-conditioned plants, cold storage plants, plants where refrigerated trucks load or unload, and plants in which operations require protection against temperature changes, have truck loading docks at which doors to the plants are opened during loading or unloading operations, thereby producing undesired temperature changes and/or waste of fuel. When a truck backs up to such a loading dock, some means must be provided for sealing spaces between the rear end of the truck and the doorway at the loading dock. Various types of dock shelters have heretofore been proposed and used in which door sealing means are provided. One known type of dock door sealing device employs a foam rubber core which is covered with fabric. When a truck backs into an assembly or set of these sealing devices installed at a dock doorway, the devices are compressed and the doorway is effectively sealed. The rear doors of the truck are generally turned to the sides of the truck and three or four hinges at each side of the truck protrude several inches rearwardly. The first truck parts to make contact with the sealing devices are the hinges, and thereafter the edges of the truck body. This means that the hinges are forced several inches into the sealing devices when the edges of the truck body contact the sealing devices. While the truck is being loaded or unloaded, the truck may sink downward or may rise on its springs respectively as much as four or five inches and cause a tearing or slashing of the foam rubber core and its fabric cover. If the hinges are rounded, the fabric and foam rubber core may not be torn at once but they will be abraded, and repeated loading or unloading of trucks at the dock will result in fraying the fabric and deterioration of the foam rubber cores so that the door seals are seriously damaged, frequently beyond repair.

Dock door-sealing devices known in the prior art generally have three pads including two vertical side columns and one horizontal top pad. Each pad has a core made of a resilient foam material. The top pad may be placed between the two side columns or may rest on top of the two side columns. A backing of wood or other rigid materials is often provided to which the foam pads are glued. A fabric cover is placed over the five exposed sides of each pad and is attached by screws or staples to the rigid backing. The cover thus envelopes all sides of each door-sealing pad except the back. The door-sealing device is then bolted to the building wall at each side of the doorway and at the top of the doorway. If any one of the covers of the side columns be damaged by the truck hinges as above explained, the top pad must be removed in order to provide access to the screws or staples which hold the damaged cover on the affected side column. Only then can the damaged cover be removed for repair or replacement. Also, if the cover of the top pad is damaged, the top pad must be removed from the assembly in order to provide access to the fasteners which hold this cover on the top pad. Thus the top pad must be removed whether the cover of the top pad or the cover of any column is damaged and whether the top pad rests on top of the columns or is disposed between them. Furthermore the covers are often so attached to the cores that it is necessary to remove the column having a damaged cover from the backing to effect release of the cover.

If an assembly of side columns and top pad on a backing be installed as a single integral unit with a single cover over the entire assembly, all the pads must be removed from the building wall to expose the fasteners of the cover at the rear of the backing, and the entire cover of the assembly must be removed for replacement or repairs. Thus even a minor damage to the cover requires a very difficult, laborious, major operation on the entire assembly.

In an attempt to remedy the above described situation it has been heretofore proposed to provide a door-sealing device with removable wear covers mounted on the permanent covers of the door-sealing pads. In order to remove the wear covers it is necessary to disassemble or remove one or more pads from the doorway of the truck dock to provide access to the fasteners of the wear covers. Furthermore the wear covers are so fixed in position on the permanent covers that they are abraded and torn along with the permanent covers by the protruding hinges of the truck doors in the same manner as described above. Patent 2,704,574 issued March 22, 1955, to J. R. Etlar, illustrates this prior type of door-sealing device.

In the dock door-sealing device embodying the present invention, the above mentioned difficulties are avoided. Novel protective aprons are provided at the front walls of the pads. Any one protective apron on any one pad can be quickly detached and repaired or replaced without having to detach or disassemble any other apron, cover or pad, and without disturbing any other section of the sealing device. The aprons are arranged so that they move along with a rising or descending truck and slide over the permanent covers of the pads to prevent damage to the aprons, covers and pads. The aprons in the present invention can be attached by known types of fasteners such as grommets with lacing, snap fasteners, slide fasteners, tape fasteners, etc. The invention thus involves two basic features, namely: provision of slidable aprons and provision of means for attaching and detaching the aprons quickly and easily without the need to detach or disassemble the protective covers of the pads and without having to detach or disassemble any of the pads.

The present invention thus has as objects provision of a novel compressible sealing pad for a dock doorway, and provision of a novel quickly detachable replaceable apron for a compressible sealing pad of a dock doorway, to prevent damage to any part of the pad due to vertical truck movements while the truck is being loaded and unloaded when in contact with the pad.

Other objects are to provide a novel sealing device for a doorway of a truck dock, the device including a plurality of pads mounted in a fixed array around the doorway, with each pad having a foam core covered by a permanent fabric cover and a movable protective apron on the front of the cover; and to provide a novel replaceable apron for a compressible sealing device or pad such that if the apron itself becomes damaged, it can be readily removed for repair or replacement without the need to disassemble or disturb the pad or any part thereof.

Other objects and advantages of the invention will become apparent from the following detailed description, taken together with the drawings, wherein:

FIG. 1 is a fragmentary perspective view of a truck dock with an assembly of sealing devices or pads embodying the invention mounted thereon.

FIG. 2 is a horizontal sectional view of a sealing pad taken on line 2—2 of FIG. 1.

FIG. 3 is a vertical sectional view of a sealing pad on an enlarged scale, taken on line 3—3 of FIG. 2.

FIG. 4 is a sectional view of a top pad taken on line 5—5 of FIG. 1.

FIG. 5 is an elevational view of a protective apron.

Referring to the drawings, there is shown in FIG. 1 a bumper board 12 extending outwardly from wall 11 of a loading dock 10. The dock has a doorway 14. At the opposite sides of the doorway are two vertical sealing devices or pads 15. Mounted between the sealing pads 15 at the top of the doorway is a horizontal top sealing device or pad 15'. The three pads are disposed in a stationary inverted rectangular U-shaped array.

Each of the sealing pads 15 as best shown in FIGS. 1, 2 and 3, has a long rectangular core formed of compressible material, preferably foam rubber, which extends beyond the front of bumper board 12, by approximately one-half the depth of each sealing pad, so that half of the depth of each pad is over the bumper board 12 and the other half of each pad protrudes out from the bumper board.

The core 18 of each pad 15 is enclosed at the top, bottom, front and sides by a snug-fitting fabric 20. This cover is formed of strong woven cloth, preferably made of nylon, coated or impregnated with a moisture-proof substance such as neoprene, synthetic rubber, plastic, or other suitable coating material.

Holes 21 are provided in the side panels 22 of the cover 20 for releasing air from the device when it is compressed. Each cover 20 has a depending flap 23 at the top and an upwardly extending flap 24 at the bottom. Each of the flaps extends the full width of the front of the cover at which it is located. These flaps are provided with closely and uniformly spaced eyelets or grommets 25a, 25b extending across the full length of the flaps. Two long vertically-extending flaps 26 are provided at the rear of the cover. These flaps are turned in at the rear of the devices or pads and are secured by tacks 27 to a rigid wood back member 28 which is used to mount the pads 15 to the walls 11 on each side of the doorway 14. The assembly of wood back member 28 and foam core 18 with its covering 20 is attached to the wall 11, or between the door jambs of the doorway, by means of angle brackets 29 and bolts 30, 31 secured in wall 11 and back member 28, at top, sides and bottom of each pad 15, or by other suitable means of mounting.

Only the front of each pad 15 is covered by a rectangular protective apron 40 shown in FIGS. 1–3 and 5. The apron is substantially equal in width to the width of the front of the pad. This apron has a rectangular fabric panel 42 formed of tough, abrasion-resistant cloth, such as nylon or the like, reinforced and impregnated or coated with a moisture-proof substance such as neoprene, polytetrafluorethylene (Teflon) or other synthetic rubber or plastic material. The panel 42 is preferably inelastic. At upper and lower ends of the panel are secured by stitching 43 two bands 44a, 44b which are preferably elastic but which may be inelastic. If they are elastic they may be made of rubber or rubberized stretch fabric and should be elastic in the longitudinal or vertical direction of panel 42. Closely and uniformly spaced grommets or eyelets 45a, 45b are provided near the top and bottom edges of the respective bands. Lacing cords 46a and 46b are engaged in adjacent grommets 25a, 45a and 25b, 45b to secure the upper and lower bands to the flaps 23, 24 respectively. Thus panels 42 and bands 44a, 44b are uniformly tensioned and supported over the front of the foam cores 18.

In order to complete an assembly of three pads, there is provided the upper horizontal compressible sealing pad 15'. This pad has a rectangular foam core 18' covered with a coated nylon or other fabric cover 20' on front, top and bottom, with top and bottom rear flaps 26' tucked behind the foam core 18' and secured by tacks 27' to a wood back member 28', as shown in FIG. 1, in a manner similar to that described for the side sealing pads 15. Holes 21' in top and bottom panels 22' of the cover 20' serve to release air when the device is compressed during use. Angle brackets 29' or other fastening means are used to secure the pad to wall 11 above doorway 14. The angle brackets are secured by bolts 30', 31' anchored in the wall 11 and back member 28'. The pad 15' has a depending front flap 23' extending the width of the pad between pads 15, with uniformly and closely spaced grommets.

Pad 15' has a protective apron 40' which has uniformly and closely spaced grommets 45' at the upper edge of inelastic fabric panel 42'. Lacing cord 46' is preferably elastic but it may be inelastic. It is engaged in the grommets of flap 23' and grommets 45' of apron 40'. The bottom edge of apron 40 is not secured to cover 20'. The apron 40' is thus uniformly supported for its entire width across the front of pad 15'.

When a truck backs into this assembly of sealing pads 15, 15', the rear side and top edges of the truck body compress the sealing pads until the truck contacts rigid bumper board 12. This prevents further compression of the sealing pads, and an effective air-tight seal is maintained between the truck body and doorway 14.

During loading and unloading of the truck while the truck body descends or rises, the bands 44a, 44b and lacing cord 46' will yield so that no material abrasion of apron panels 42, 42' occurs. The aprons move down or up in engagement with the truck body and slide with respect to the front panels of the covers 20, 20'. The foam cores 18 and 18' and covers 20, 20' are not displaced or injured during the movements of the aprons. The aprons protect the foam rubber cores and fabric covers even though the door hinges of the truck penetrate the sealing pads to a depth of several inches.

If after a time the aprons 40, 40' become worn, they can be readily removed by untying the lacing cords and replaced with new aprons. The covered foam cores and fabric covers remain in place while the aprons are being changed and the installation need not be otherwise disturbed.

In the present invention, in addition to reducing the problem of wear which is accomplished by providing a slidable apron, the apron has the desirable feature that it is quickly detachable without disturbing the core and core cover. This quick detachable feature may be provided by means of the lacing cords illustrated in the drawing or by any equivalent means such as slide fasteners, pressure tape fasteners, snap fasteners and the like. Formerly, as previously explained, it was necessary to disassemble the entire door sealing assembly in order to replace the wear-resistant covers of the door-sealing pads, since the positioning of the upper foam pad on top of the two vertical pads, or the positioning of the top foam pad between the two vertical pads, made it impossible to remove the covers without disassembling the entire assembly.

In the present invention the aprons cover only the front wearing surfaces of the pads. The attaching means is on the upper and lower ends only of the front wearing surfaces and hence can be readily detached without disassembling the pads. Thus in the present invention, the aprons are not only movable while in use, they also can be removed easily and quickly without disassembling the sealing pads or their covers.

Although the cores 18 may be made of foam rubber, they can be made of resilient foam plastic material or other compressible, resilient material.

If desired, the top sealing pad 15' can be provided with an apron similar to apron 40 having upper and lower bands 44a, 44b or just one upper band 44a. Bands 44a, 44b may be elastic or inelastic. In some installations, it may be possible to omit the lower bands 44a from the aprons used in sealing pads 15. The lower laces 46b and lower flaps 24 may also then be omitted. The lower ends of panels 42 will then hang free like the lower end of panel 42' in sealing device 15'. In some installations, it may be possible to omit both bands 44a, 44b from the aprons 40 and to substitute elastic or inelastic cords to join the adjacent edges of the aprons and flaps 23,24, similar to the arrangement of panel 42', cord 46' and flap 23' of device 15'. When inelastic cords and/or bands are used, sufficient slack will exist in the lacing of the cords to permit vertical movement of the panels 42 while the truck pressing against the panels moves up and down.

Various other modifications may be made without departing from the invention as defined by the appended claims. What is claimed and sought to be protected by Letters Patent of the United States is:

1. A sealing device for the doorway of a truck dock, comprising an elongated rectangular flexible core having a flat, horizontal upper end, a fabric cover substantially enclosing the core, a back member in said cover for supporting the core and cover in a vertical stationary position in said doorway, said cover having a vertical front panel, said cover having a horizontal top portion overlaying the horizontal upper end of the core, said front panel having an upper horizontal end united with a horizontal front edge of the top portion of the cover, a rectangular inelastic flexible apron vertically disposed at and slidably covering a major portion of only said front panel, said apron having its upper end spaced from the upper end of the front panel, and elastic means connected between the upper end of the apron and the horizontal top portion of the cover, so that when a truck body is compressing the core with door hinges pressing parts of the apron and cover into the core and while the truck body moves up and down during unloading and loading respectively of the truck body, the apron moves vertically up and down with the truck body in contact with the front panel while the core and cover remain stationary, and whereby the elastic means contracts and expands during the up and down movements respectively of the apron while the elastic means continuously connects the upper end of the apron and top of the cover.

2. A sealing device for the doorway of a truck dock, comprising the combination of claim 1, wherein said elastic means comprises a flat vertically disposed elastic band secured at its lower edge to the upper end of the apron, and a quickly removable and replaceable lacing cord connecting the upper edge of the elastic band to the horizontal top portion of the cover, so that the elastic band contracts and expands during the up and down movements respectively of the apron, while the lacing cord continuously connects the elastic band to the top portion of the cover.

3. A sealing device for the doorway of a truck dock, comprising the combination of claim 1, wherein said core has a flat horizontal bottom end, said cover having a bottom end portion covering the bottom end of the core and united at its forward edge with the bottom end of the front panel, said combination further comprising second elastic means connecting the lower end of the apron and the bottom end portion of the cover, said second elastic means cooperating with the first named elastic means to hold the apron for its entire length in contact with the front panel, and whereby the first named elastic means contracts and the second elastic means expands and vice versa during the up and down movements respectively of the apron while both elastic means continuously connect both ends of the apron to the top and bottom end portions respectively of the cover.

4. A sealing device for the doorway of a truck dock, comprising the combination of claim 3, wherein the first named elastic means comprises a first flat vertical elastic band secured at its lower edge to the upper end of the apron, and a first quickly removable and replaceable lacing cord connecting the upper edge of the first elastic band to the top portion of the cover; and said second elastic means comprises a second flat vertical elastic band secured at its upper edge to the lower end of the apron, and a second quickly removable and replaceable lacing cord connecting the lower edge of the second elastic band to the bottom end portion of the cover, whereby the first elastic band contracts while the second elastic band expands and vice versa during the up and down movements respectively of the apron while the first and second lacing cords remain connected to the first and second elastic bands respectively and to the top and bottom end portions respectively of the cover.

5. A sealing assembly for the doorway of a truck dock, comprising a first two horizontally spaced vertically disposed sealing devices located at opposite sides of said doorway, a third sealing device disposed over said doorway, said third sealing device having flat vertical ends abutting inner opposing vertical sides of the first two sealing devices, and means for securing the three sealing devices in stationary positions at said doorway; each of the sealing devices comprising an elongated rectangular flexible core having a flat, horizontal upper surface, a fabric cover substantially enclosing the core, a back member in said cover for supporting the core and cover in a stationary position in the doorway, said cover having a vertical front panel, said cover having a horizontal top portion overlaying the horizontal upper surface of the core, said front panel having an upper horizontal edge united with a horizontal front edge of the top portion of the cover, a rectangular inelastic flexible apron vertically disposed at and slidably covering a major portion of only said front panel, said apron having its upper end spaced from the upper edge of the front panel, and elastic means connected between the upper end of the apron and the horizontal top portion of the cover, so that when a truck body is compressing the core and while the truck body moves up and down during unloading and loading respectively of the truck body the apron moves vertically up and down with the truck body in contact with the front panel while the core and cover remain stationary, and whereby the elastic means contracts and expands during the up and down movements respectively of the apron while the elastic means continuously connects the upper end of the apron and the horizontal top portion of the cover.

6. A sealing assembly for the doorway of a truck dock, comprising the combination of claim 5, wherein the elastic means of the first two sealing devices comprises a vertical flat elastic band secured at its lower edge to the ouper end of the apron, and a quickly removable and replaceable lacing cord connecting the upper edge of the elastic band to the horizontal top portion of the cover, so that the elastic band contracts and expands during the up and down movements respectively of the apron, while the lacing cord continuously connects the elastic band to the top portion of the cover.

7. A sealing assembly for the doorway of a truck dock, comprising the combination of claim 5, wherein each of the first two sealing devices further comprises second elastic means, said core having a flat horizontal bottom end, said cover having a bottom end portion covering the bottom end of the core and united at its forward edge with the lower end of the front panel, said second elastic means connecting only the lower end of the apron to the bottom end portion of the cover, said second elastic means cooperating with the first named elastic means to hold the apron for its entire length in contact with the front panel, whereby the second elastic means expands and contracts during the up and down movements respectively of the apron while the second elastic means continuously connects the lower ends of the apron and front panel.

8. A sealing assembly for the doorway of a truck dock, comprising the combination of claim 7, wherein the first named elastic means comprises a first flat vertical elastic band secured at its lower edge to the upper end of the apron, and a first quickly removable and replaceable lacing cord connecting the upper edge of the first elastic band to the top portion of the cover; and said second elastic means comprises a second flat vertical elastic band secured at its upper edge to the lower end of the apron, and a second quickly removable and replaceable lacing cord connecting the lower edge of the second elastic band to the bottom end portion of the cover, whereby the first elastic band contacts while the second elastic band expands and vice versa during the up and down movements respectively of the apron while the first and second lacing cords remain connected to the first and second elastic bands respectively and to the top and bottom end portions respectively of the cover.

9. A sealing device for the doorway of a truck dock, comprising two vertical horizontally spaced pads and a horizontal pad, means supporting the three pads in an inverted rectangular U-shaped array at the sides and top of said doorway; each pad comprising an elongated rectangular flexible core having a flat horizontal upper surface, a fabric cover substantially enclosing the core, means for supporting the cover and core in a stationary position at said doorway, said cover having a vertical rectangular front panel, a rectangular flexible apron vertically disposed at and slidably covering a major portion of only said front panel a support for the apron secured to the upper end of the cover and having a portion overlaying the front panel and extending the full width of the front panel, and quick detachable means attaching the apron to said support at closely spaced points along the entire length of said portion and the entire width of the apron so that the apron is uniformly supported across its entire width and can be detached and replaced without disassembling and disturbing the core and cover of the core of any one of the pads.

10. A sealing device as recited in claim 9, further comprising another apron support secured to the lower end of the cover of one the pads, said other apron support having a portion extending along the front panel at its lower end for the full width of the panel, and further quick detachable and replaceable means attaching the lower end of the one apron at uniformly and closely spaced points for its entire width to said portion of the other apron support, so that the one apron is uniformly tensioned and supported at the front of said one pad.

11. A sealing device for the doorway of a truck dock, comprising an elongated rectangular flexible core having a flat vertical front, a fabric cover substantially enclosing the core, said cover having a vertical front panel abutting the front of the core, a rectangular flexible apron having a width substantially equal to the width of said panel vertically disposed at and slidably covering a major portion of only the front panel, an apron support secured to the cover at its upper surface and extending across the full width of said panel at its upper end, quick detachable and replaceable means attaching the apron to said apron support at uniformly and closely spaced points along the entire width of said panel and apron at the front of the cover, so that the apron is uniformly supported at its upper end and can be detached and replaced without disassembling and disturbing the core and cover of the core, wherein said apron support is a narrow flap having a portion depending from the upper end of the cover and overlaying the upper end of the panel, said flap portion having uniformly and closely spaced fastener elements at its upper end extending the full width of the flap, said apron having other uniformly and closely spaced fastener elements at its upper end extending the full width of the apron, said quick detachable and replaceable means engaging the fastener elements of both said flap portion and said apron uniformly across the width of the front panel of the cover.

12. A sealing device for the doorway of a truck dock, comprising an elongated rectangular flexible core having a flat vertical front, a fabric cover substantially enclosing the core, said cover having a vertical front panel abutting the front of the core, a rectangular flexible apron having a width substantially equal to the width of said panel vertically disposed at and slidably covering a major portion of only the front panel, an apron support secured to the cover at its upper surface and extending across the full width of said panel at its upper end, quick detachable and replaceable means attaching the apron to said apron support at uniformly and closely spaced points along the entire width of said panel and apron at the front of the cover, so that the apron is uniformly supported at its upper end and can be detached and replaced without disassembling and disturbing the core and cover of the core, another apron support secured to the lower end of the cover and extending across the full width of said panel at its lower end, and other quick detachable and replaceable means attaching the lower end of the apron to said other apron support at uniformly and closely spaced points across the width of the panel, so that the apron is uniformly supported and tensioned across the front panel.

13. A sealing device as recited in claim 12, wherein said other apron support comprises another narrow flap having a portion overlaying the lower end of the panel, said portion of the other flap having further uniformly and closely spaced fastener elements extending the full length of said other flap, said apron having further uniformly and closely spaced fastener elements extending the full width of the apron at its lower end, said other quick detachable and replaceable means engaging the further fastener elements of both said other flap portion and the lower end of the apron for the entire width of the panel.

References Cited by the Examiner

UNITED STATES PATENTS

| 1,444,536 | 2/1923 | Boyce | 297—230 X |
| 1,768,454 | 6/1930 | King | 297—219 X |
| 2,105,997 | 1/1938 | Church | 297—224 X |
| 2,259,026 | 10/1941 | Pagliere | 297—224 |
| 2,704,574 | 3/1955 | Etlar | 20—69 X |
| 3,181,205 | 5/1965 | Frommelt et al. | 20—69 |

FOREIGN PATENTS 431,008    6/1935    Great Britain.

HARRISON R. MOSELEY, *Primary Examiner.*

W. E. HEATON, A. I. BREIER, *Assistant Examiners.*